United States Patent
Szigeti et al.

(10) Patent No.: US 12,218,931 B2
(45) Date of Patent: Feb. 4, 2025

(54) COLLABORATION APPLICATION INTEGRATION FOR USER-IDENTITY VERIFICATION

(71) Applicant: Cisco Technology, Inc., San Jose, CA (US)

(72) Inventors: Thomas Szigeti, Vancouver (CA); Stefano Giorcelli, Valbonne (FR); Frank Michaud, Pully (CH); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 17/168,301

(22) Filed: Feb. 5, 2021

(65) Prior Publication Data

US 2022/0255923 A1 Aug. 11, 2022

(51) Int. Cl.
*H04L 9/40* (2022.01)
*G06V 40/16* (2022.01)
*G06V 40/70* (2022.01)
*G10L 17/22* (2013.01)

(52) U.S. Cl.
CPC ........ *H04L 63/0861* (2013.01); *G06V 40/172* (2022.01); *G06V 40/70* (2022.01); *G10L 17/22* (2013.01); *H04L 63/0853* (2013.01); *H04L 63/0876* (2013.01); *H04L 63/18* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 10,027,662 B1 * | 7/2018 | Mutagi | H04L 63/0861 |
| 10,681,547 B1 * | 6/2020 | Yang | H04L 63/0263 |
| 11,341,222 B1 * | 5/2022 | Caffey | H04W 12/06 |
| 2011/0035788 A1 * | 2/2011 | White | H04L 9/3231 |
| | | | 726/4 |

(Continued)

FOREIGN PATENT DOCUMENTS

WO WO-2009055228 A2 * 4/2009 ......... G06K 9/00892

OTHER PUBLICATIONS

A-Fairuz et al., "Multi-channel, Multi-level Authentication for More Secure eBanking", Information Security South Africa Conference 2010, Sandton Convention Centre, Sandton, South Africa, Aug. 2-4, 2010. Proceedings ISSA 2010. (Year: 2010).*

(Continued)

*Primary Examiner* — Piotr Poltorak
(74) *Attorney, Agent, or Firm* — Polsinelli P.C.

(57) ABSTRACT

Disclosed are methods, systems, and non-transitory computer-readable media for utilizes a collaboration application to provide data beneficial to the authentication of the user. The present application discloses receiving at least one item of personal identifying information for a user from a primary multi-factor authentication device. The present application further discloses receiving at least one item of personal identifying information for a user from a conferencing service in which the user is engaged in a conference. The present application also discloses determining whether to authenticate the user based on the items of personal identifying information from the primary multi-factor authentication device and from the conferencing service.

17 Claims, 6 Drawing Sheets

(56) References Cited

U.S. PATENT DOCUMENTS

| | | | |
|---|---|---|---|
| 2013/0305337 A1 | 11/2013 | Newman et al. | |
| 2014/0109210 A1* | 4/2014 | Borzycki | A63F 13/213 |
| | | | 726/7 |
| 2014/0123275 A1* | 5/2014 | Azar | G06V 10/772 |
| | | | 726/19 |
| 2015/0365522 A1 | 12/2015 | Anderson et al. | |
| 2020/0272716 A1 | 8/2020 | Hassan et al. | |
| 2020/0342084 A1 | 10/2020 | Zhao | |
| 2020/0401791 A1* | 12/2020 | Gao | G06V 10/768 |
| 2021/0176235 A1* | 6/2021 | Keith, Jr. | H04L 63/0853 |
| 2021/0288829 A1* | 9/2021 | Zhang | H04L 9/3213 |
| 2022/0232004 A1* | 7/2022 | Soman | G06N 20/00 |

OTHER PUBLICATIONS

Al-Fairuz et al, "Multi-channel, Multi-level Authentication for More Secure eBanking", Published in Information Security South Africa Conference, Sandton Convention Center, Proceedings ISSA 2010 (Year: 2010).*

Al-Assam et al, "On security of multi-factor biometric authentication," 2010 International Conference for Internet Technology and Secured Transactions, London, UK, 2010, pp. 1-6. (Year: 2010).*

Abbadi, "Multi-Factor Authentication Techniques for Video Applications Over The Untrusted Internet," University of Ottawa, 2012, pp. 1-142.

* cited by examiner

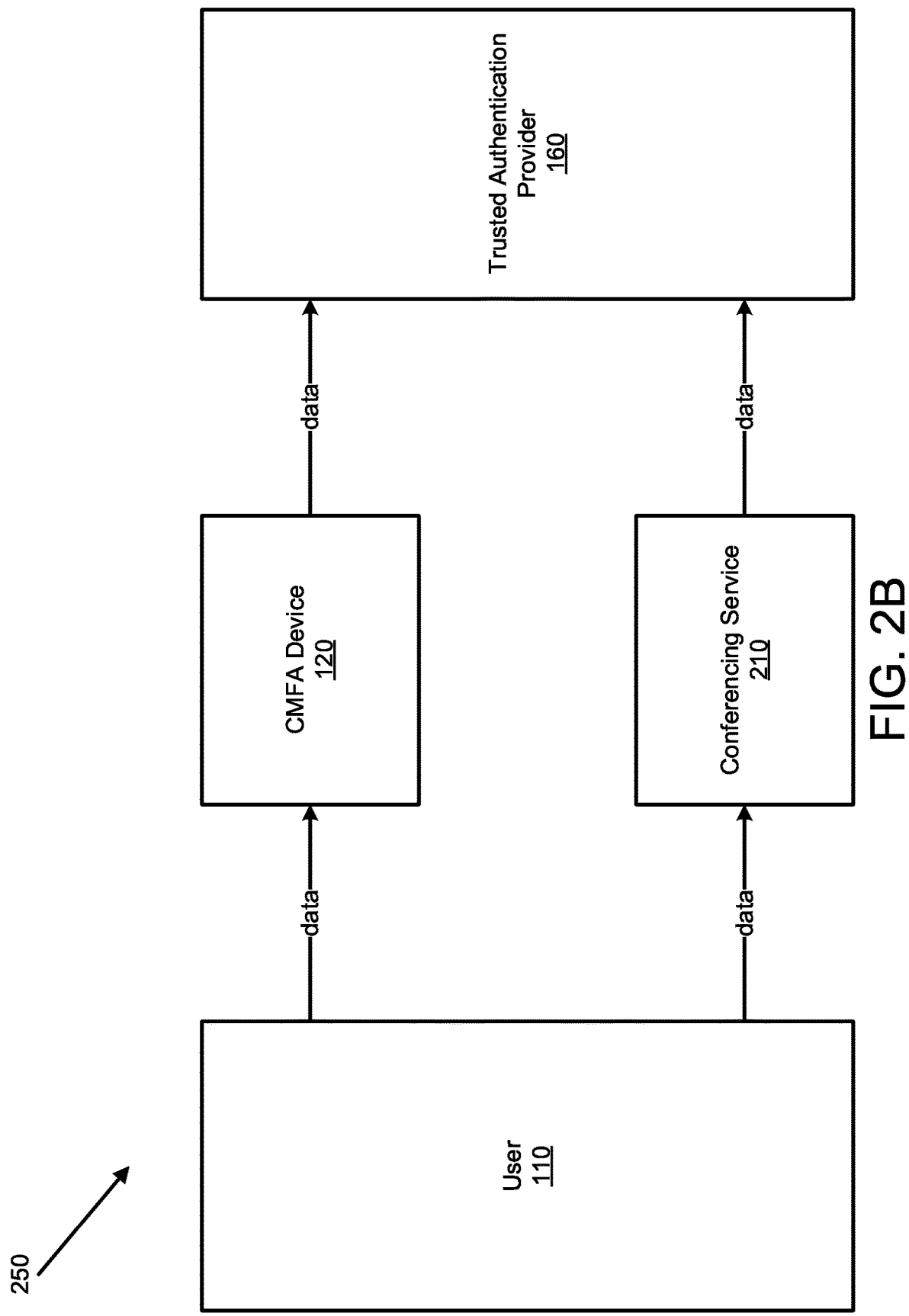

350

```
┌─────────────────────────────────────────────────────────────────────┐
│ Determining that a confidence score associated with at least one item of personal │
│ identifying information from a primary multi-factor authentication device is insufficient to │
│                        authenticate a user                          │
│                               360                                   │
└─────────────────────────────────────────────────────────────────────┘
                                  │
                                  ▼
┌─────────────────────────────────────────────────────────────────────┐
│ Determining that a second device or service exists that might be able to supply the at │
│   least one item of personal identifying information with a higher confidence score │
│                               370                                   │
└─────────────────────────────────────────────────────────────────────┘
                                  │
                                  ▼
┌─────────────────────────────────────────────────────────────────────┐
│ Requesting the at least one item of personal identifying information from the second │
│                          device or service                          │
│                               380                                   │
└─────────────────────────────────────────────────────────────────────┘
```

FIG. 3B

COLLABORATION APPLICATION INTEGRATION FOR USER-IDENTITY VERIFICATION

TECHNICAL FIELD

The present technology pertains to a system for authentication of a user, and more specifically, the present technology pertains to a system that utilizes a collaboration application to provide data beneficial to the authentication of the user.

BACKGROUND

Users and devices are now commonly authenticated with multi-factor authentication, using multiple factors to access a resource to have more certainty over the identity of the user. However, devices used for multi-factor authentication may not be ideal for capturing certain kinds of authentication data. For instance, smartphone devices used for multi-factor authentication may be poorly suited to capturing facial or vocal recognition data, especially when the user is actively engaged with a second device. In some cases, engagement with this second device may actually provide superior facial or vocal recognition data than what is available from the multi-factor authentication device. Leveraging data from secondary devices for multi-factor authentication purposes poses a technical challenge.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A and 2B illustrate example collaboration application integration systems in accordance with some aspects of the present technology;

FIGS. 3A and 3B are flowcharts of methods for determining whether to authenticate a user in accordance with some aspects of the present technology.

DETAILED DESCRIPTION

Figure 1:
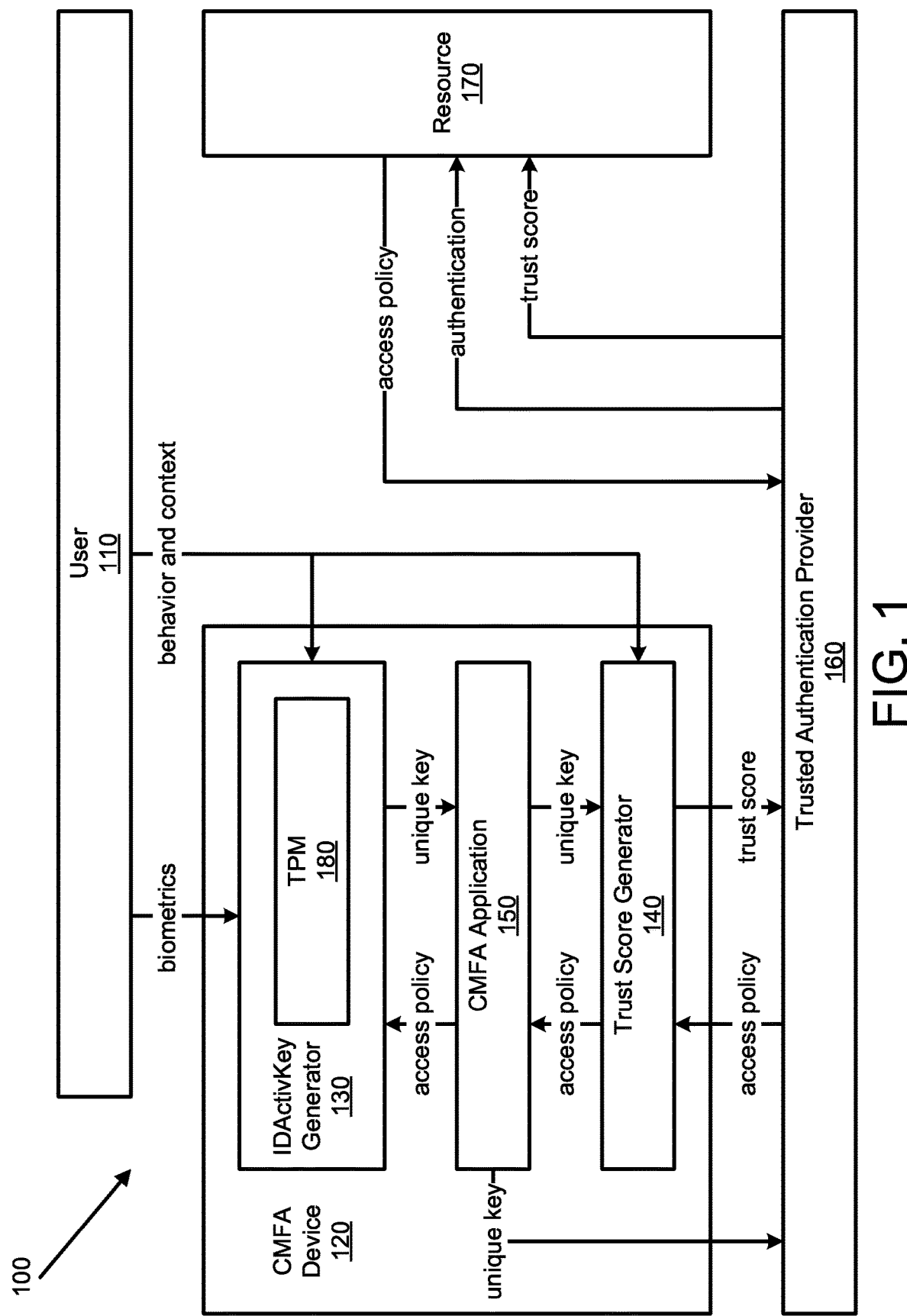
FIG. 1 illustrates an example continuous multi-factor authentication (CMFA) system in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Methods, systems, and non-transitory computer-readable media are provided for determining whether to authenticate a user in a continuous multi-factor authentication system.

A method includes receiving at least one item of personal identifying information for a user from a primary multi-factor authentication device; receiving at least one item of personal identifying information for a user from a conferencing service in which the user is engaged in a conference; and determining whether to authenticate the user based on the items of personal identifying information from the primary multi-factor authentication device and from the conferencing service.

In some embodiments of the method, the personal identifying information is biometric information and behavioral pattern information.

In some embodiments, the method further includes determining that a confidence score associated with the at least one item of personal identifying information from the primary multi-factor authentication device is insufficient to authenticate the user; determining that a second device or service exists that might be able to supply the at least one item of personal identifying information with a higher confidence score; and requesting the at least one item of personal identifying information from the second device or service.

In some embodiments of the method, the second device or service is the conferencing service.

In some embodiments of the method, determining that the confidence score is insufficient to authenticate the user includes determining that the user is not looking at the primary multi-factor authentication device.

In some embodiments of the method, determining that the second device or service exists includes determining from calendar information or presence tool information that the user is attending a meeting.

In some embodiments of the method, the at least one item of personal identifying information received from the conferencing service includes receiving an identification of the user and a confidence score indicating a confidence in the identification.

In some embodiments of the method, the conferencing service is configured to perform a biometric identification of the user.

In some embodiments of the method, the identification of the user is a user name, a user account, or another user identifier.

In some embodiments of the method, the identification is transmitted via a secure API over a network.

In some embodiments of the method, the identification is performed by a server of the conferencing service and transmitted to an endpoint used to access the conferencing service, wherein the endpoint can transmit the identification to the primary multi-factor authentication device.

In some embodiments of the method, transmission of the identification by the endpoint to the primary multi-factor authentication device is done via a Bluetooth or ultrasonic connection.

In some embodiments of the method, the at least one item of personal identifying information from the conferencing service includes three streams of data, wherein each stream is labeled by a common flow ID, wherein a first stream of data includes data about a video stream and includes a quality score that represents a confidence score for facial recognition of the user; a second stream of data includes data about an audio stream and includes a quality score that represents a confidence score for a voice recognition for the user; a third stream of data includes a quality score that represents a confidence score indicating that behavior of the user in using the conferencing service is consistent with a pattern of past behavior by the user; and wherein an identity of the user is extracted from correlating an IP address, MAC address, and user ID from data in the three streams of data.

In some embodiments of the method, the confidence score that the behavior of the user in using the conferencing service is consistent with the pattern of past behavior by the user includes factors such as how the user uses the conferencing service, how many meetings the user has during a day, and who is in the meetings with the user.

In some embodiments of the method, the conferencing service is associated with a score indicating a quality of data coming from the conferencing service, wherein the score is used to weigh the data when determining whether to authenticate the user.

In some embodiments of the method, the conferencing service reports a precise location of the user based on a known location of a conferencing endpoint which transmits the at least one items of personal identifying information.

A system includes one or more processors and at least one non-transitory computer-readable medium having stored therein instructions which, when executed by the one or more processors, cause the one or more processors to perform operations including receiving at least one item of personal identifying information for a user from a primary multi-factor authentication device; receiving at least one item of personal identifying information for a user from a conferencing service in which the user is engaged in a conference; and determining whether to authenticate the user based on the items of personal identifying information from the primary multi-factor authentication device and from the conferencing service.

A non-transitory computer-readable medium includes instructions which, when executed by a processor, cause the processor to perform operations including receiving at least one item of personal identifying information for a user from a primary multi-factor authentication device; receiving at least one item of personal identifying information for a user from a conferencing service in which the user is engaged in a conference; and determining whether to authenticate the user based on the items of personal identifying information from the primary multi-factor authentication device and from the conferencing service.

DESCRIPTION OF EXAMPLE EMBODIMENTS

The present technology pertains to methods, systems, and non-transitory computer-readable media for utilizing a collaboration application to provide data relevant to authentication of a user in a multi-factor authentication system (MFA).

MFA systems are often instantiated in an individual MFA device, which may or may not be well-suited to gathering certain kinds of data. For instance, a smartphone MFA device may be perfect for gathering fingerprint biometrics, but poorly suited for continuously gathering facial recognition biometrics while the user is not using the device. When certain authentication factors cannot be gathered in a satisfactory manner, the ability of an MFA system to confidently authenticate a user diminishes, increasing the probability of adversarial uses of a user's account and potentially compromising important private information.

The present technology, by integrating data from a collaboration application, mitigates these risks by increasing the number and quality of factors available to an MFA system. This disclosure will first discuss an example continuous multi-factor authentication (CMFA) system. Then, the disclosure will discuss example embodiments related to determining whether to authenticate a user in a continuous multi-factor authentication system by using information from a primary multi-factor authentication device and information from a conferencing service. Finally, the disclosure will discuss an example computing system which can be used to execute the present technology.

FIG. 1 illustrates an example continuous multi-factor authentication (CMFA) system 100 in accordance with some aspects of the present technology. User 110 can gain authorized access to resource 170 by using CMFA device 120.

Resource 170 can be any service, resource, device, or entity to which requires authentication of user 110. For example, resource 170 can be a social media service, bank, hospital, motor vehicle department, bar, voting system, IOT device, or access device. In some embodiments, resource 170 can be accessed by user 110 through an access device, such as a mobile phone or personal computer. In some embodiments, resource 170 can be accessed by user 110 through an application that is specifically designed for accessing resource 170, or through a more general application which can access multiple services, such as a web browser, or portions of an operating system. In some embodiments, resource 170 can be the same device as CMFA device 120. In some embodiments, resource 170 can be a plurality or resources, such as an access device and a service which receive separate authentications from trusted authentication provider 160.

Resource 170 can authenticate the identity of user 110 through trusted authentication provider 160, which can be in communication with CMFA device 120. Data gathered by CMFA device 120 can be used for authentication of user 110 to resource 170 via trusted authentication provider 160. Trusted authentication provider 160 can receive an identification credential, such as an IDActivKey, from CMFA device 120 via CMFA application 150 that is unique to resource 170 for user 110. Trusted authentication provider 160 can also receive a trust score from CMFA device 120 via trust score generator 140. Upon receiving an IDActivKey and a trust score, trusted authentication provider 160 can use this information in tandem with access requirements received from resource 170 to authenticate user 110 to resource 170.

To generate identification credentials, CMFA Device 120 can be associated with user 110, and can gather biometric, behavioral, and contextual data from user 110. The biometric, behavioral, or contextual data, or some combination, can be used by IDActivKey generator 130 to generate a unique IDActivKey corresponding to resource 170. These biometrics can include, for example, fingerprints, facial detection, retinal scans, voice identification, or gait data, among other biometrics. For each resource 170, a cryptographic seed from a pseudo-arbitrary number generator in trusted platform module (TPM) 180 can be used to select a sampling of the biometric data to be used in an IDActivKey for the application in question. In some embodiments, the IDActivKey may only be derived when CMFA device 120 determines that certain behavioral and contextual requirements indicate compliance with a policy. In some embodiments, there can be a "master" IDActivKey that is used to gain access to trusted authentication provider 160.

In some embodiments, behavioral and contextual data can be used to ensure that the context of user 110 is acceptable as specified by a policy of resource 170. Behavioral and contextual data can be used by trust score generator 140, which can generate a trust score as a measure of confidence in the authentication of user 110, and as a measure of confidence that the authenticated user 110 is still present and behaving in an acceptable manner as specified by a policy of resource 170.

In some embodiments, trusted computing implementations, such as TPM 180, can rely on roots of trust. Roots of trust can provide assurances that the root has been implemented in a way that renders it trustworthy. A certificate can identify the manufacturer and evaluated assurance level (EAL) of TPM 180. Such certification can provide a level of confidence in the roots of trust used in TPM 180. Moreover, a certificate from a platform manufacturer may provide assurance that TPM 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 140 can generate a trust score for user 110 using behavioral and contextual data, the surrounding environment, or other sources. For example, location information can be derived from the network that user 110 is using. These data can include information about location, movement, or device behavior. The trust score reflects a confidence level that user 110 is in compliance with a policy specified by resource 170. This includes the confidence that user 110 is the person operating the current session.

Trusted authentication provider 160 can request updated IDActivKeys and trust scores at different intervals depending on the requirements specified by the access policies defined by resource 170. It can send new access policies received from resource 170 during a session to CMFA device 120. Trusted authentication provider 160 can shield private information from resource 170, providing authentication without revealing information such as birth dates, social security numbers, or marital status, etc. In some embodiments, trusted authentication provider 160 need only inform resource 170 that access should be granted, while in some embodiments trusted authentication provider 160 can send an IDActivKey to resource 170.

User 110 can be any user including an employee, contractor, client, member of an organization, or private individual, etc. attempting to access a service. User 110 can use an access device to access resource 170 which may or may not be the same device as CMFA device 120. In some embodiments, CMFA device 120 can be used to authenticate an access device.

CMFA device 120 can be hardware, software-only, or combinations thereof. CMFA device 120 can be a mobile device or a personal computer; it may or may not be the same device as access device 110. In some embodiments, CMFA device 120 can include secure hardware such as trusted platform module (TPM) 180. In some embodiments, one or more of IDActivKey generator 130, TPM 180, and trust score generator 140 can be located in a physically separate and secure portion of CMFA device 120.

While FIG. 1 only illustrates one application 190, and one resource 170, it should be appreciated that there can be any number of applications 190 or application providers 170. Each resource 170 can have its own access policy, and any IDActivKey will be unique to each respective resource 170.

While a multi-factor authentication device can increase confidence that the current user of a device is indeed the authorized user, it does not allows have access to the best data for authenticating a user. Specifically for facial and vocal recognition factors, a multi-factor authentication device might not have a complete view of a face, or voice might be coming from a source a distance away from the device. Users are unlikely to continuously show their face to a multi-factor authentication device, and their voice might be distanced unless the user is on calls using the device.

Meanwhile, there are many instances where users will be engaged with voice or video calls on other devices like personal computers, laptops, tablets, smartphones, conference room systems, etc., and as such, these devices are better suited to provide voice and facial recognition of a user. The present technology integrates a multi-factor authentication system with collaboration applications and thereby increases confidence in a user's identity for authorization purposes. Confidence in a user's identity is increased with higher-quality and more consistent facial recognition, higher-quality and more consistent vocal recognition, and new contextual data.

The present disclosure will detail both systems (in FIGS. 2A and 2B) and methods (in FIGS. 3A and 3B) for integrating collaboration applications into a multi-factor authentication system and using their data to authenticate (or not authenticate) a user of a multi-factor authentication device.

Figure 2A:
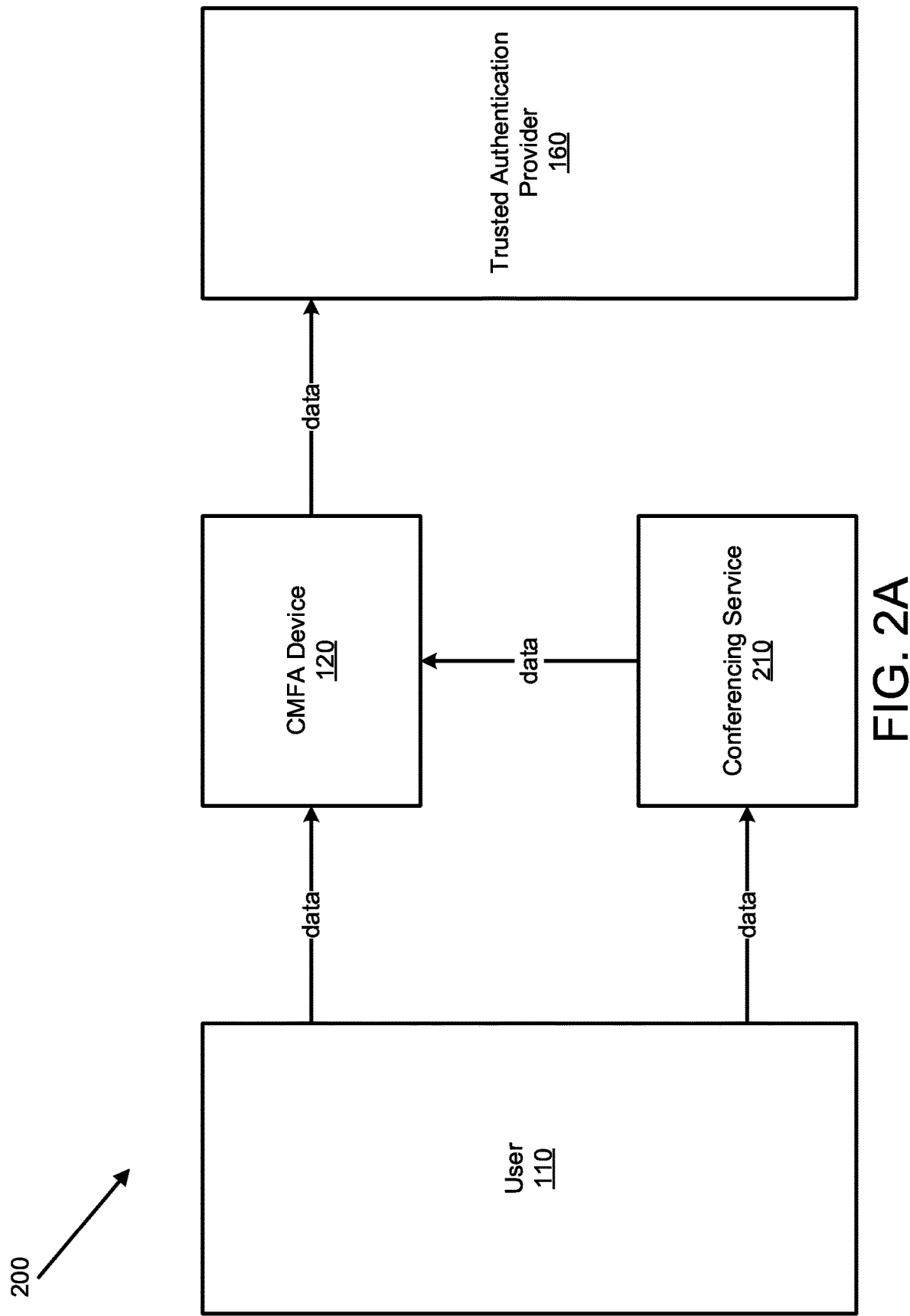

FIG. 2A illustrates an example collaboration application integration system 200 in accordance with some aspects of the present technology.

Conferencing service 210 can be any device supporting a conferencing service in which user 110 is engaged in a conference. It can use audio, video, or both to allow user 110 to conference with other users. It can be a personal device, such as a company laptop, or a device or series of devices such as those laid out in business conference rooms.

Just as CMFA device 120 can receive biometric, behavioral, and contextual data from user 110 as illustrated in FIG. 1, conferencing service 210 can receive data from user 110, such as video data of the face of user 110 or audio data of the voice of user 110. When user 110 is engaged in a conference via conferencing service 210, the quality of data for facial and vocal recognition is likely to be higher than such data gathered by CMFA device 120.

In continuous multi-factor authentication systems, the advantage of using conferencing service 210 as a factor in authenticating user 110 increases. This is because facial and vocal recognition can be done continuously whenever user 110 is looking at the screen for conferencing service 210 or speaking. In some embodiments, CMFA device 120 and conferencing service 210 can be the same device, where CMFA device 120 is running a collaboration application.

Conferencing service 210 can recognize user 110 and send data received from user 110 to CMFA device 120. It can use data received from user 110 in combination with other data about user 110, such as company onboarding records or information associated with an account with conferencing service 210 for user 110, to recognize user 110. Conferencing service 210 can also send this retrieved data to CMFA device 120. In some embodiments, the data received from user 110 can be facial point data or voice excerpt data, which can be sent to CMFA device 120 to analyze and integrate this data into generating an IDActivKey or a trust score for user 110, as illustrated in FIG. 1.

In some embodiments, conferencing service 210 can perform identification of user 110, and can send data informing CMFA 120 that conferencing service 210 has identified user 110 via facial recognition and/or voice recognition. In this embodiment, non-personally identifiable information needs to be transmitted between conferencing service 210 and CMFA device 120. This information can then be sent to trusted authentication provider 160.

In some embodiments, when conferencing service 210 is running on CMFA device 120, it can pair with an external conferencing system. Conferencing service 210 can receive data from the external conferencing system and share this data, such as facial and vocal recognition data, with CMFA application 150 running on CMFA device 120. Conferencing service 210 can pair with an external conferencing system using Bluetooth, Wi-Fi, ultrasonic discovery mechanisms, or other protocols.

In some embodiments, conferencing service 210 can generate its own identifications and trust scores for users of conferencing service 210. These identifications and trust scores can, for example, be generated by comparing a previously-stored photograph with the current video feed in conferencing service 210. These identifications and trust scores can be shared with CMFA device 120 and used in the authentication and trust score protocols employed by CMFA device 120.

FIG. 2B illustrates an example collaboration application integration system 250 in accordance with some aspects of the present technology.

In FIG. 2B, conferencing service 210 can send data directly to trusted authentication provider 160 instead of to CMFA device 120 as illustrated in FIG. 2A. Trusted authentication provider 160 can determine whether to authenticate user 110 based on the data received from CMFA 120 and conferencing service 210 in tandem.

In some embodiments, trusted authentication provider 160 can request data from conferencing service 210 after determining that data from CMFA device 120 is insufficient to authenticate user 110. In some embodiments, trusted authentication provider 160 can receive data with an insufficient trust score and can determine that a second device, such as conferencing service 210, exists which could provide better quality data (such as data for facial and vocal recognition). In other cases, trusted authentication provider 160 can request data from conferencing service 210 based on the belief that conferencing service 210 has superior data to that provided by CMFA device 120.

Trusted authentication provider 160 could learn of conferencing service 210 by querying a calendar of user 110. In some embodiments, CMFA device 120 might need to query the calendar, or CMFA device 120 can proactively notify trusted authentication provider 160 that user 110 is scheduled to be in a meeting. For example, CMFA device 120 might determine that a trust score is too low and then take steps to determine that user 110 is scheduled to be in a meeting at this time, and can notify trusted authentication provider 160. Trusted authentication provider 160 could also learn that conferencing service 210 is available as an authentication supplement by receiving a notification from conferencing service 210 when conferencing service 210 identifies a conference participant.

In some embodiments, conferencing service 210 can generate an identification of user 110 and a trust score accompanying the identification of user 110. Identification of user 110 can take the form of biometrics, user names, user accounts, or other user identifiers. For example, to log into a conferencing application, conferencing service 210 may require facial identification coupled to a user account. To send this information to trusted authentication provider 160, conferencing service 210 can use a secure API over a network to protect the identification of user 110.

In some embodiments, conferencing service 210 can send three separate streams of data. The first can be a video stream including a quality score which represents confidence in the facial recognition of user 110. The second can be an audio stream including a quality score which represents confidence in the vocal recognition of user 110. The third can be a quality score which represents confidence that the behavior of user 110 is consistent with past behavior.

Flow IDs for the data streams can be used to protect the privacy and anonymity of user 110. Each stream can be labeled by a common flow ID. Flow IDs can include a random identifier, as well as information about the sender and receiver of the data. Flow IDs can be visible to network devices or to trusted authentication provider 160. Networks analytics platforms, such as CISCO DNA Center, can crossreference data from various servers to correlate specific flow IDs with user 110, specifically by correlating an IP address, MAC address, and user ID from data included in the three streams. Servers storing this data can be servers for conferencing service 210, trusted authentication provider 160, network servers, or other sources. In this manner, randomly-generated flow IDs can be assigned to users like user 110 without transferring personally identifiable information, such as a user's name.

In some embodiments, the method for correlating flow IDs with user 110 can include:
1) Recognizing, by Network-Based Application Recognition (NBAR) technology running on network devices, flow IDs in the data streams coming from conferencing service 210
2) Sending the flow IDs to a network analytics platform via network telemetry
3) Correlating, at the networks analytic platform, the network telemetry flow IDs with data streams received from conferencing service 210, including the video stream and audio stream
4) Obtaining the IP address for user 110 as the source IP of the network telemetry flows or as the source IP of the data streams received from conferencing service 210
5) Cross-referencing the IP address with databases to obtain the MAC address associated with the IP address
6) Identifying user 110 using the MAC address In some embodiments, conferencing service 210 can be an application residing on an access device, which can be CMFA device 120 or a separate access device. In some embodiments, the access device could host an application integrated with a multi-factor authentication system to provide auxiliary data to trusted authentication provider 160 or CMFA device 120. This application could run in the background and gather data on user 110, such as facial recognition data, or occasionally ping user 110 to take a picture. In some embodiments, the access device could use a conferencing service 210 even when user 110 is not in a conference to gather data on user 110 and share it with trusted authentication provider 160 or CMFA device 120.

Figure 3A:
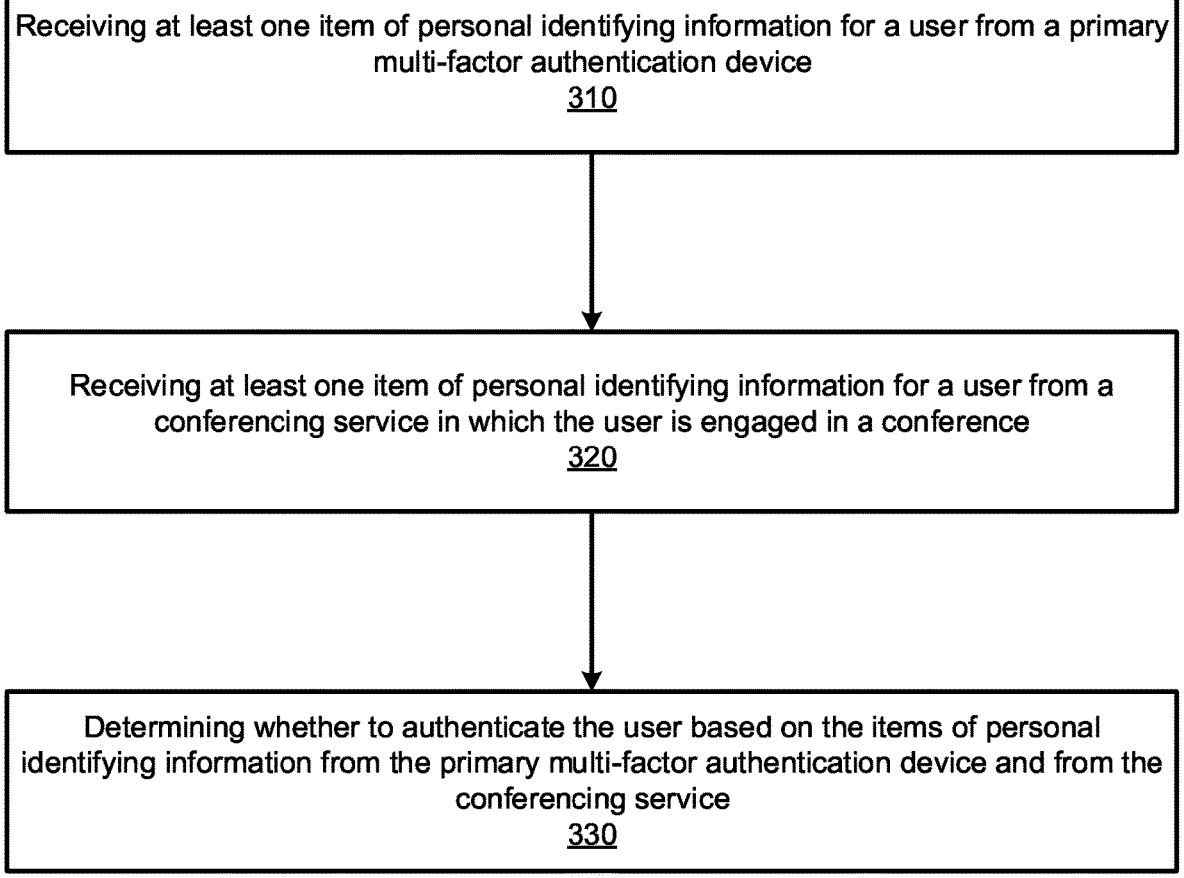

FIG. 3A illustrates an example method 300 for determining whether to authenticate a user in accordance with some aspects of the present technology. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

In some embodiments, the method includes receiving at least one item of personal identifying information for a user from a primary multi-factor authentication device at block 310. For example, CMFA device 120 illustrated in FIG. 1 can receive at least one item of personal identifying information for the user from the primary multi-factor authentication device.

In some embodiments, the method includes receiving at least one item of personal identifying information for the user from a conferencing service in which the user is engaged in a conference at block 320. For example, CMFA device 120 illustrated in FIG. 1 can receive at least one item of personal identifying information for the user from a conferencing service in which the user is engaged in a conference. In some embodiments, receiving the at least one item of personal identifying information received from the conferencing service includes receiving an identification of the user and a confidence score indicating a confidence in the identification.

In some embodiments, the conferencing service is configured to perform a biometric identification of the user. In some embodiments, the identification of the user is a user name, a user account, or another user identifier. For example, a conferencing service can use facial and vocal recognition to match a conference user with a stored user account.

In some embodiments, the identification of the user is transmitted via a secure API over a network. A secure API can provide benefits by mitigating the risk of adversaries intercepting data identifying the user.

In some embodiments, the identification is performed by a server of the conferencing service and transmitted to an endpoint used to access the conferencing service. For instance, the identification can be based on information associated with a user account that the user has with the conferencing service. In some embodiments, the endpoint can transmit the identification of the user to the primary multi-factor authentication device, such as CMFA device 120 illustrated in FIG. 1. In some embodiments, transmission of the identification by the endpoint to the primary multi-factor authentication device can be done via a Bluetooth or ultrasonic connection.

In some embodiments, the at least one item of personal identifying information from the conferencing service can include three streams of data. In some embodiments, each of the three streams of data is labeled by a common flow ID. Flow IDs can be used to match user data to a user without revealing a user's identity, as discussed above. In some embodiments, the first stream of data includes data about a video stream and includes a quality score that represents a confidence score for facial recognition of the user, the second stream of data includes data about an audio stream and includes a quality score that represents a confidence score for a voice recognition for the user, and a third stream of data includes a quality score that represents a confidence score indicating that behavior of the user in using the conferencing service is consistent with a pattern of past behavior by the user. In some embodiments, the confidence score that the behavior of the user in using the conferencing service is consistent with the pattern of past behavior by the user includes factors such as how the user uses the conferencing service, how many meetings the user has during a day, and who is in the meetings with the user. In some embodiments, an identity of the user is extracted from correlating an IP address, MAC address, and user ID from data in the three streams of data.

In some embodiments, the conferencing service is associated with a score indicating a quality of data coming from the conferencing service. In some embodiments, the score is used to weight the data when determining whether to authenticate the user.

In some embodiments, the conferencing service reports a precise location of the user based on a known location of a conferencing endpoint which transmits the at least one items of personal identifying information. The known location can be further used to determine whether to authenticate the user, such as when the user is an expected or unexpected location based on past behavior or other factors used in the authentication of the user.

In some embodiments, the method includes determining whether to authenticate the user based on the items of personal identifying information from the primary multi-factor authentication device and from the conferencing service at block 330. For example, CMFA device 120 illustrated in FIG. 1 can determine whether to authenticate the user based on the items of personal identify information from the primary multi-factor authentication device and from the conferencing service. The personal identifying information can include biometric information, identification numbers, addresses, vital statistics, location information, user names, or other items of information but cannot include semi-randomly generated numbers that indicate the user is in possession of a certificate or security key, such as a DUO code. In some embodiments, the personal identifying information can be used to identify or reasonably infer an identity of a person. In some embodiments, the personal identifying information can include biometric information and behavioral pattern information.

In some embodiments, method 300 can be performed by a continuous multi-factor authentication service that is responsible for both initial authentication and continued authentication, which requires maintaining a level of trust that the user is identified. For example, CMFA device 120 illustrated in FIG. 1 can perform method 300.

FIG. 3B illustrates an example method 350 for determining whether to authenticate a user in accordance with some aspects of the present technology. Although the example method 350 depicts a particular sequence of operations, the sequence may be altered without departing from the scope of the present disclosure. For example, some of the operations depicted may be performed in parallel or in a different sequence that does not materially affect the function of the method 350. In other examples, different components of an example device or system that implements the method 350 may perform functions at substantially the same time or in a specific sequence.

In some embodiments, the method includes determining that a confidence score associated with at least one item of personal identifying information from a primary multi-factor authentication device is insufficient to authenticate a user at block 360. For example, CMFA device 120 illustrated in FIG. 1 can determine that a confidence score associated with at least one item of personal identifying information from a primary multi-factor authentication device is insufficient to authenticate a user. The item of personal identifying information could be a dark photograph of the user's face insufficient for facial recognition, or a noisy recording of the user's voice insufficient for vocal recognition.

In some embodiments, the method includes determining that a second device or service exists that might be able to supply the at least one item of personal identifying information with a higher confidence score at block 370. For example, CMFA device 120 illustrated in FIG. 1 can determine that a second device or service exists that might be able to supply the at least one item of personal identifying information with a higher confidence score. In some embodiments, the second device or service is a conferencing service. In some embodiments, determining that the confidence score is insufficient to authenticate the user includes determining that the user is not looking at the primary multi-factor authentication device. In some embodiments, determining that the second device or service exists includes determining from calendar information or presence tool information that the user is attending a meeting, such as a meeting using a conferencing service. In some embodiments, a second device or service could be sought even if the at least one item of personal identifying information from the primary multi-factor authentication device is sufficient to authenticate the user.

In some embodiments, the method includes requesting the at least one item of personal identifying information from the second device or service at block 380. For example, CMFA device 120 illustrated in FIG. 1 can request the at least one item of personal identifying information from the second device or service.

Figure 4:
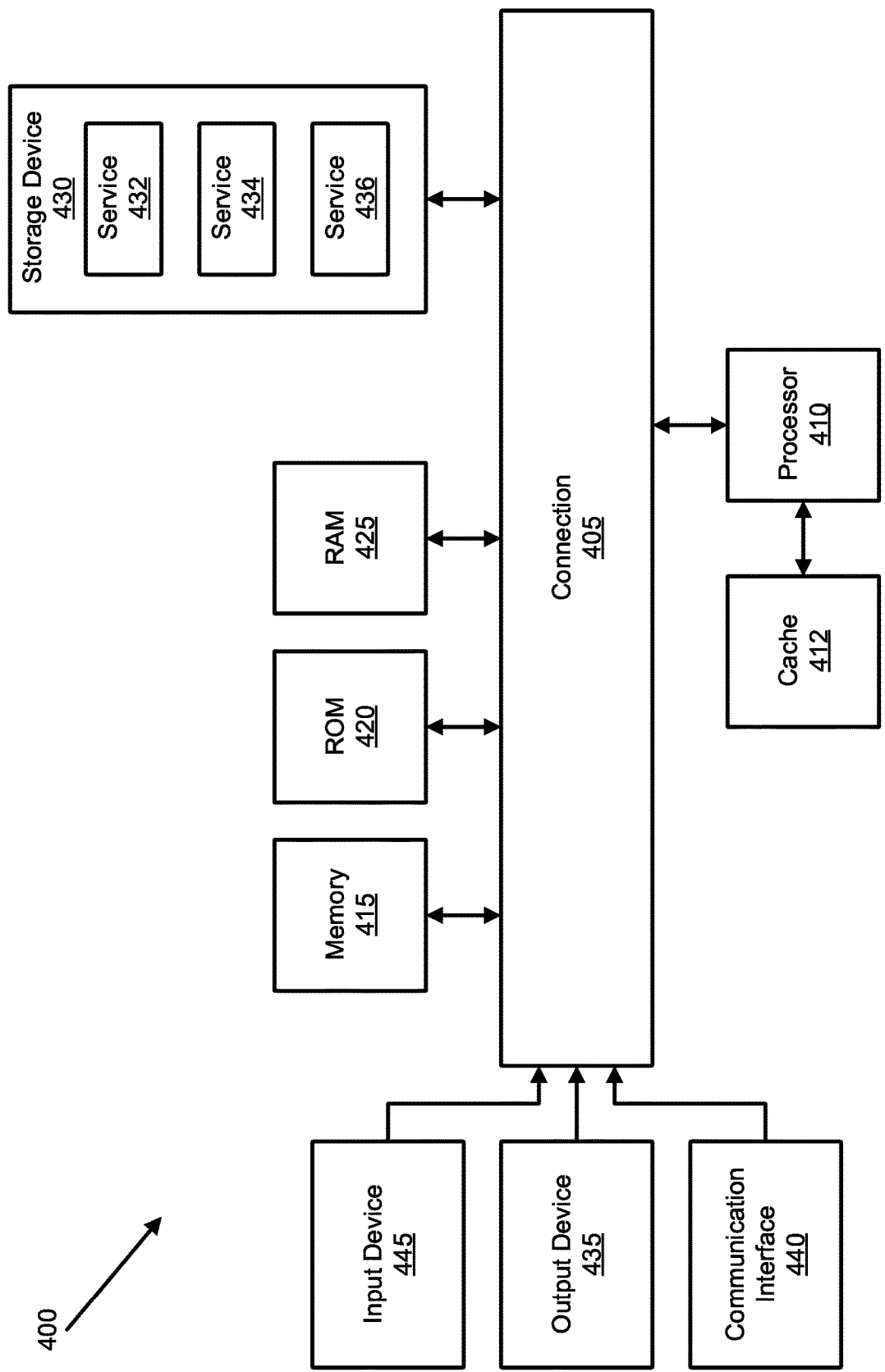
FIG. 4 shows an example of a system for implementing certain aspects of the present technology.

FIG. 4 shows an example of computing system 400, which can be for example any computing device making up CMFA device 120 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   receiving a first item of personal identifying information for a user from a primary multi-factor authentication device;
   determining that the first item of personal identifying information is insufficient to authenticate the user of the primary multi-factor authentication device due to a low confidence score associated with facial feature information;
   based on the first item of personal identifying information being insufficient to authenticate the user, determining that a second service independent of the primary multi-factor authentication device is able to supply a second item of personal identifying information with a higher confidence score associated with the facial feature information than the primary multi-factor authentication device, wherein the second service is a conferencing service;
   receiving the second item of personal identifying information for a user from the conferencing service in which the user is engaged in a conference; and
   authenticating the user based on the second item of personal identifying information from the conferencing service rather than from the primary multi-factor authentication device.

2. The method of claim 1, wherein the second service is executing on a series of devices within a conference room during the conferencing service.

3. The method of claim 1, wherein determining that the confidence score is insufficient to authenticate the user comprises:
   determining that the user is not looking at the primary multi-factor authentication device based on video captured by the second service.

4. The method of claim 1, wherein determining that the second service is able to supply a second item of personal identifying information comprises:
   determining that the user is attending a meeting based on calendar information or presence tool information; and
   obtaining the second item of personal identifying information from the conferencing service based on the step of determining that the user is attending the meeting.

5. The method of claim 1, wherein the second item of personal identifying information received from the conferencing service includes receiving an identification of the user and a confidence score indicating a confidence in the identification.

6. The method of claim 5, wherein the identification of the user is a user name, a user account, or another user identifier.

7. The method of claim 5, wherein the identification is transmitted via a secure API over a network.

8. The method of claim 5, wherein the identification is performed by a server of the conferencing service and transmitted to an endpoint used to access the conferencing service, wherein the endpoint can transmit the identification to the primary multi-factor authentication device.

9. The method of claim 8, wherein transmission of the identification by the endpoint to the primary multi-factor authentication device is done via a Bluetooth or ultrasonic connection.

10. The method of claim 1, wherein the second item of personal identifying information from the conferencing service includes three streams of data, wherein each stream is labeled by a common flow ID, wherein:

a first stream of data includes data about a video stream and includes a quality score that represents a confidence score for facial recognition of the user;
a second stream of data includes data about an audio stream and includes a quality score that represents a confidence score for a voice recognition for the user;
a third stream of data includes a quality score that represents a confidence score indicating that behavior of the user in using the conferencing service is consistent with a pattern of past behavior by the user; and
wherein an identity of the user is extracted from correlating an IP address, MAC address, and user ID from data in the three streams of data.

11. The method of claim 10, wherein the confidence score that the behavior of the user in using the conferencing service is consistent with the pattern of past behavior by the user includes factors such as how the user uses the conferencing service, how many meetings the user has during a day, and who is in the meetings with the user.

12. The method of claim 1, wherein the conferencing service is associated with a score indicating a quality of data coming from the conferencing service, wherein the score is used to weigh the data when determining whether to authenticate the user.

13. The method of claim 1, wherein the conferencing service reports a precise location of the user based on a known location of a conferencing endpoint which transmits the second item of personal identifying information.

14. A system comprising:
one or more processors; and
at least one non-transitory computer-readable medium having stored therein instructions which, when executed by the one or more processors, cause the one or more processors to perform operations comprising:
  receiving a first item of personal identifying information for a user from a primary multi-factor authentication device;
  determining that the first item of personal identifying information is insufficient to authenticate the user of the primary multi-factor authentication device due to a low confidence score associated with facial feature information;
  based on the first item of personal identifying information being insufficient to authenticate the user, determining that a second service independent of the primary multi-factor authentication device is able to supply a second item of personal identifying information with a higher confidence score associated with the facial feature information than the primary multi-factor authentication device, wherein the second service is a conferencing service;
  receiving the second item of personal identifying information for a user from the conferencing service in which the user is engaged in a conference; and
  authenticating the user based on the second item of personal identifying information from the conferencing service rather than from the primary multi-factor authentication device.

15. The system of claim 14, wherein the determining that the second service is able to supply the second item of personal identifying information comprises:
  determining that the user is attending a meeting based on calendar information or presence tool information; and
  obtaining the second item of personal identifying information from the conferencing service based on the step of determining that the user is attending the meeting.

16. A non-transitory computer-readable medium having stored therein instructions which, when executed by a processor, cause the processor to perform operations comprising:
  receiving a first item of personal identifying information for a user from a primary multi-factor authentication device;
  determining that the first item of personal identifying information is insufficient to authenticate the user of the primary multi-factor authentication device due to a low confidence score associated with facial feature information;
  based on the first item of personal identifying information being insufficient to authenticate the user, determining that a second service independent of the primary multi-factor authentication device is able to supply a second item of personal identifying information with a higher confidence score associated with the facial feature information than the primary multi-factor authentication device, wherein the second service is a conferencing service;
  receiving the second item of personal identifying information for a user from the conferencing service in which the user is engaged in a conference; and
  authenticating the user based on the second item of personal identifying information from the conferencing service rather than from the primary multi-factor authentication device.

17. The non-transitory computer-readable medium of claim 16, wherein the determining that the second service is able to supply the second item of personal identifying information comprises:
  determining that the user is attending a meeting based on calendar information or presence tool information; and
  obtaining the second item of personal identifying information from the conferencing service based on the step of determining that the user is attending the meeting.

* * * * *